July 28, 1959  D. E. PRYOR ET AL  2,896,568
TEMPERATURE INDICATING DEVICES
Filed May 6, 1957  2 Sheets-Sheet 1

INVENTORS
DEAN E. PRYOR
JOHN C. BAKER
BY
Christie, Parker & Hale
ATTORNEYS

July 28, 1959 D. E. PRYOR ET AL 2,896,568
TEMPERATURE INDICATING DEVICES
Filed May 6, 1957 2 Sheets-Sheet 2

INVENTORS
DEAN E. PRYOR
JOHN C. BAKER
BY
Christie, Parker & Hale
ATTORNEYS

2,896,568
TEMPERATURE INDICATING DEVICES

Dean E. Pryor, Gonzales, and John C. Baker, Alhambra, Calif.

Application May 6, 1957, Serial No. 657,261

7 Claims. (Cl. 116—114.5)

This invention is concerned with devices for indicating maximum temperatures in refrigerators and the like, and particularly in refrigerated cars and trucks used for shipment of perishable products such as meats, fruits and vegetables. The invention provides novel devices for such purposes, the devices being characterized by simplicity, ruggedness, reliability and convenience.

When produce, say lettuce, is shipped in railroad refrigerator cars or refrigerated motor trucks, damage may occur if the temperature within the refrigerated space gets too high. If the produce arrives at its destination in a spoiled condition it is important to know the maximum temperature achieved in transit. The maximum temperature can be determined by means of a conventional recording thermometer placed in the car or truck before shipment, but such instruments are massive, delicate and costly—as well as expensive to return to the shipper. In consequence such equipment has not found commercial application in this field, and there is a distinct need for a simple, rugged device which will produce the necessary information and which is so inexpensive that, if desired, it may be discarded after a single use. We have developed such a device, which has proved itself in a number of test shipments.

The device of our invention utilizes a container having a plurality of wells. Frozen substances having different melting points in the temperature range of interest are disposed respectively in the wells. Conveniently, the substances may be introduced in liquid form into the wells and frozen in situ, then the container is placed in a refrigerator car or the like along with the perishable cargo so that if any of the substances melt in transit, they will migrate out of the wells as a result of gravity or capillary attraction or both. The migration may then be detected by observation.

To best procure certain special advantages, a preferred form of the device of our invention employs two blocks with mating surfaces, one block serving as a container and the other block serving as a sort of lid. Spaced wells are disposed in the container block and open into its mating surface. The several wells hold frozen substances having different melting points over the range of interest, say 36° F. to 66° F. A sheet having an absorbent surface is placed between the mating surfaces of the two blocks, and means is provided for clamping the two blocks together with the sheet between them. The substances in the wells are colored so that when they melt they will leave a characteristic stain on the absorbent surface of the sheet. Such use of color resolves any ambiguity or later confusion in evaluating the resulting records.

One side of the sheet is composed of impervious resilient material such as rubber or plastic and this serves as a gasket. The sheet may be clamped between the two blocks with either its gasket surface facing the container block or its absorbent surface facing the container block. Hence, a supply of the containers may be filled with the liquid substances and assembled as described with the gasket side of the sheets facing the container blocks to seal the liquid substances within the wells. This supply of sealed containers may be efficiently made up all in one batch, and conveniently kept in the unfrozen condition until needed.

Prior to use, a sealed container is refrigerated until its contents are frozen. Then the two blocks are unclamped and the sheet is turned over so that its absorbent surface faces the wells in the container block, whereupon the two blocks are again clamped together. The device is then placed in a refrigerated car with the wells directed downward. If during shipment the temperature within the car goes above the melting point of one of the substances in the wells, this substance will melt, flow downward, and come in contact with and stain the absorbent surface of the sheet. Hence, the maximum temperature attained during shipment will be indicated by the spots formed on the absorbent surface of the sheet. Upon arrival at the destination, the sheet may be removed and mailed back to the shipper so that he has a record of what happened, as far as temperature is concerned, during the shipment.

The sheet has a portion projecting beyond the mating surfaces of the blocks. The car number, shipment date, shipper's name and address and other information may be placed on this projecting portion or tag. Aside from completely identifying the shipment, the shipper's signature on this projecting portion of the sheet insures him to a large degree against tampering or the return of fraudulent records.

If desired, a key may be formed in one mating surface and a keyway in the other to prevent misassembly of the device.

We prefer to employ substances in the wells which will tend to creep or move by capillary action when they thaw. Then if, by chance, the device is installed in the refrigerated space with the wells facing upward, the substances upon thawing will creep out of the wells and stain the absorbent material.

While it is possible to make the blocks of almost any solid substance that does not react with the materials placed in the wells, we have discovered that it is most advantageous to form them of transparent plastic so that their internal condition may be observed even when they are assembled.

For identification purposes, it may be desirable to place the wells in an asymmetric pattern.

Any type of clamping means may be employed. We have achieved good results with a strong spring clamp, but a conventional screw type clamp has also proved to be satisfactory.

Another form of the device of our invention is so designed that it makes a record not only of the maximum temperature attained during shipment, but also of the approximate duration of this temperature. In this form of our device the wells in the block contain the frozen substances having the different melting points, but the outlet of each well is an orifice through which leakage occurs at a predetermined rate. If any of the substances melt during shipment, the amount of leakage of the substance affords a measure of the time that this substance was in a liquid condition and hence of the time that the substance was above its melting point. The device is designed so that the wells may be conveniently sealed upon arrival at the destination, and the device may be mailed back to the shipper, without the need of refrigeration, for his permanent record.

Preferably the leak or orifice is placed downward during shipment, so that the leakage is aided by gravity, but if the substance is such that it tends to move through the orifice by capillary attraction, or otherwise creep, the orifice may be placed in an upwardly extending position.

These and other features of our invention will be understood more thoroughly in the light of the following detailed description of several forms of the device, taken in conjunction with the accompanying drawings, in which.

Figure 1:
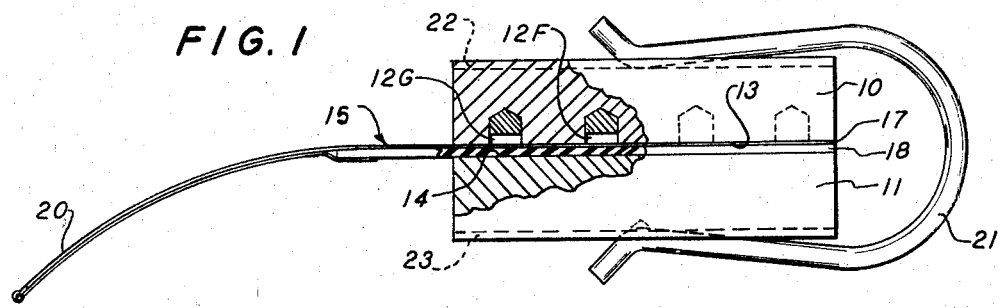
Fig. 1 is a side view, partly in section, of one presently preferred form of the device.
Figure 2:
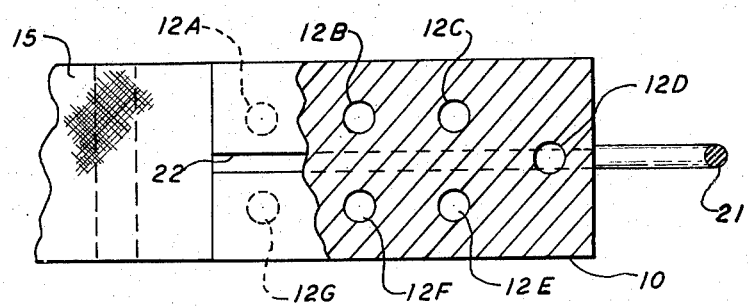
Fig. 2 is a plan view, partly in section, of the device of Fig. 1.

The device of Figs. 1 and 2 comprises a first rectangular block 10 and a second rectangular block 11 of transparent plastic material, say methyl methacrylate resin. The first block contains seven wells 12A, 12B, 12C, 12D, 12E, 12F and 12G and serves as a container. These wells open to a flat mating surface 13 of the first block. The second block is solid and contains no wells but has a mating surface 14 for that of the first block, so that it acts somewhat like a lid.

Fig. 1 shows the apparatus in condition for use, with the seven wells containing, respectively, substances having different melting points in frozen condition. The substances are originally placed in the wells in liquid condition, then frozen in the wells prior to use. A laminated sheet 15 is shown disposed between the mating surfaces of the blocks. The upper side 17 of this sheet is composed of absorbent material, say cloth. The lower side 18 of the sheet, as viewed in Fig. 1, is formed of any suitable impervious material that will not be adversely affected by freezing temperatures or by the action of the chemicals, such as plastics. A long integral extension 20 of the sheet projects beyond the ends of the assembled blocks and serves, as indicated previously, as a mailing tag, etc. When in use, the two blocks are clamped together by means of a U-shaped spring 21 the ends of which fit in longitudinal grooves 22 and 23 in the respective outer surfaces of the two blocks.

A great variety of chemicals having proper melting points may be employed in the wells. By way of example, the following may be employed in the seven wells of the device of Figs. 1 and 2:

| | Melting point, ° F. |
|---|---|
| Mixture of methyl laurate and methyl caprate | 36 |
| Mixture of methyl laurate and methyl caprate | 39 |
| Mixture of methyl laurate and methyl myristate | 42 |
| N-tetradecane | 45 |
| Mixture of methyl laurate and methyl myristate | 48 |
| or N-hexadecane | 48 |
| Mixture of ethyl myristate and methyl laurate | 51 |
| Methyl myristate | 63 |

Although pure chemicals having desired melting points are preferable from some standpoints, the mixtures in the preceding table work well and are accurate to plus or minus 1 ° F. They have the further advantage of cheapness and availability.

We prefer to dye the substances for identification purposes. Suitable dyes are oil-red and curcumin. One leaves a red stain and the other a yellow stain, and the substances employed in the several wells are dyed alternately red and yellow to aid in reading the record. By way of example, the mixture of methyl laurate and methyl caprate having a melting point of 36° F. may be dyed with curcumin and placed in the well 12A, while the second mixture of methyl laurate and methyl caprate melting at 39° F. is dyed red and placed in the second well 12B, etc.

Other pure substances having melting points within the range of interest are methyl laurate melting at 41° F., trioctanoin melting at 34° F., methyl myristate melting at 53° F., and methyl oleate melting at 55° F.

In preparing the device of Figs. 1 and 2 for use, the several chemicals containing the dyes are placed in the wells of the first block with the mouths of the wells facing upward. The wells are not filled completely. The sheet is then placed over the wells with the non-absorbent gasket surface of rubber, plastic or the like adjacent to the chemicals. The second block is then placed on top of the first and the two blocks are clamped together so that the chemicals are sealed inside the wells. The device may be kept indefinitely in this condition without refrigeration. Prior to using the device, it is placed in a refrigerator with the wells facing upward so that the liquid is at the bottom of the wells. The device is refrigerated until all of the chemicals have been frozen. After all the chemicals have been frozen, the device is unclamped and the sheet is turned over so that the absorbent cloth comes next to the frozen chemicals but is separated from them by spaces in the wells. The device is then re-assembled and placed in a refrigerated car with the wells facing downward so that if any chemical melts, it will flow onto the absorbent material and make a visible spot.

Figure 3:
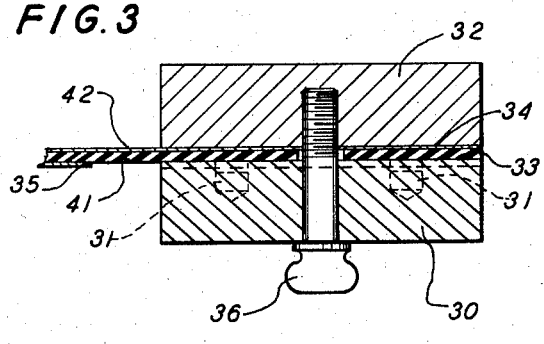
Fig. 3 is a sectional side view of a modification of the device of Figs. 1 and 2.
Figure 4:
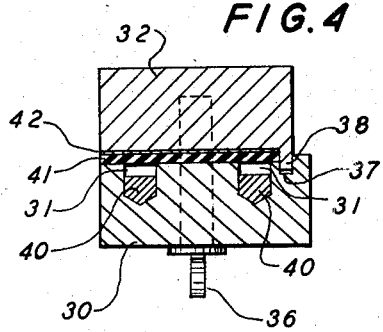
Fig. 4 is a sectional end view of the device of Fig. 3.

The device of Figs. 3 and 4 is essentially the same as that of Figs. 1 and 2, and differs only in mechanical details. Thus, it comprises a first rectangular block 30 having four identical wells 31 and a second block 32. The two blocks have flat mating surfaces 33, 34. A sheet 35 is clamped between the blocks by means of a thumbscrew 36 passing through the first block and threaded into the second. The first block is provided with a longitudinal keyway 37, and the second block has a longitudinal key 38 which fits into the first block upon assembly, thus assuring proper alignment.

In Figs. 3 and 4 the device is shown assembled in the condition in which the chemicals are frozen, i.e. with the wells in the first block facing upward and containing the chemicals 40 and with the non-absorbent or gasket portion 41 of the sheet disposed toward the chemicals while the absorbent face 42 of the sheet is remote from the chemicals. After the chemicals have been frozen, the device is reassembled and the sheet is reversed so that the absorbent portion of the sheet is adjacent to the chemicals. Then, the device is placed in the refrigerated car with the head of the clamping screw uppermost so that the wells face downward.

Figure 5:
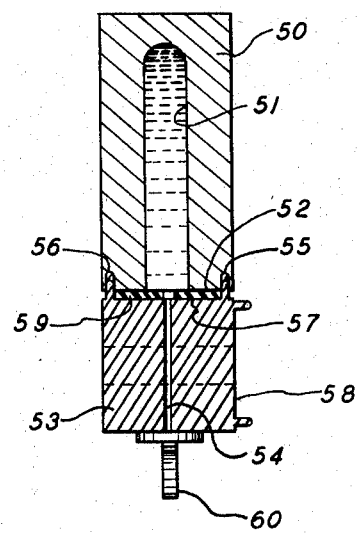
Fig. 5 is a sectional end view of another form of our device provided with leaks which provide a measure of temperature duration.
Figure 6:
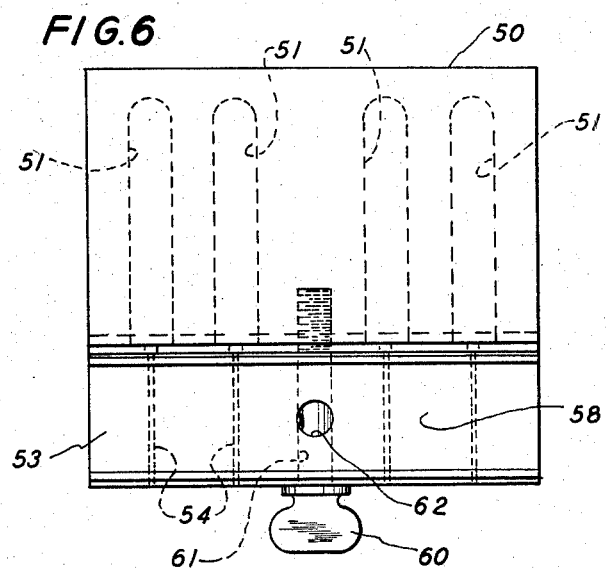
Fig. 6 is a side view of the device of Fig. 5.
Figure 7:
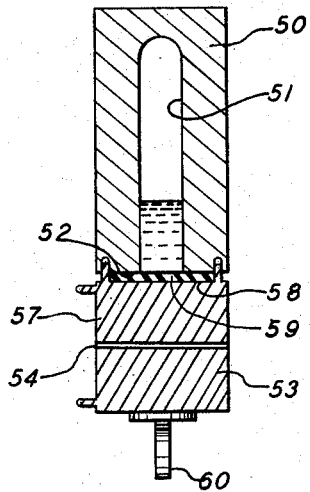
Fig. 7 is a sectional end view of the device of Figs. 5 and 6 in the condition in which it is returned to the shipper.

In the device of Figs. 5, 6 and 7 there is a first block 50 provided with a plurality of identical wells 51 which open onto a mating surface 52. A second block 53 is provided with orifices or leaks 54, one for each well. There are two longitudinal keyways 55, 56 in the bottom of the first block and the second block has two mating surfaces, each with a set of longitudinal keys. Thus one mating surface 57 is perpendicular to the leaks and the other 58 is parallel to the leaks. A resilient gasket 59 is held between the two blocks by means of a wing bolt 60 which passes through the second block and is threaded into the first block.

In preparing the device of Figs. 5, 6 and 7 for introduction into a refrigerator car or the like, the first block is inverted so that the wells open upward. Each well is filled with a chemical having a different melting point. Then the second block is placed on top of the first block and clamped in position with the leaks opening into the respective wells. The bolt is inserted into a first bore 61 in the lower block and the two blocks are clamped together with the gasket between them. At some stage, with the wells facing upward, the chemicals are frozen. Then the assembled device containing the frozen chemicals is placed in the refrigerated space in the position shown in Figs. 5 and 6 with the wells facing downward. Each leak is of such size that its chemical will pass through it in a liquid condition at a predetermined rate. For example, a leak may be constructed of such size that the contents of a well will drain out of it in a period of 36 hours. If desired, the leaks may be filled with absorbent material to gain additional control over the rate of fluid flow through the leak.

When the refrigerator car arrives at its destination, the device of Figs. 5, 6 and 7 is immediately withdrawn and reassembled in the position shown in Fig. 7, without spilling any of the contents of the wells and with the wing bolt passing through a second bore 62 in the second block. In this position the several wells are sealed by the mating surface 58 and the amount of chemical remaining in each well as an index not only of the temperature represented by the well but also of the duration of this temperature. If, for example, a leak is calibrated to discharge the entire contents of a well in 36 hours and upon arrival at destination a third of the contents of a well has leaked out, it becomes apparent that temperature represented by the melting point of the substance in the well has been exceeded during shipment for a period of about 12 hours.

When the device has been reassembled, as shown in Fig. 7, it is mailed back to the shipper without refrigeration and constitutes his record of temperature history for the shipment it represents.

Although we prefer to employ gravity as a force for promotion of leakage in the device of Figs. 5, 6 and 7, it is not essential. In other words, the leaks may be of such size that they will operate by capillarity even though they open upward.

We claim:

1. In a device for recording maximum temperatures of refrigerators and the like, the combination which comprises two blocks having mating surfaces, one of the blocks being provided with a series of wells spaced from each other over its mating surface, a plurality of substances having different melting points disposed respectively in the wells, a reversible removable sheet having one side composed of absorbent material and the other side of impermeable material disposed between the two mating surfaces and covering the wells and projecting outside of the two blocks, and means for clamping the blocks together with the sheet between their mating surfaces with either of the two sides facing the wells.

2. In a device for recording maximum temperatures of refrigerators and the like, the combination which comprises two blocks having mating surfaces, one of the blocks being provided with a series of wells asymmetrically spaced from each other over its mating surface, a plurality of substances having different melting points disposed respectively in the wells, a reversible removable sheet having one side composed of absorbent material and the other side composed of impermeable material disposed between the two mating surfaces and covering the wells, and means for clamping the blocks together with the sheet between their mating surfaces with either of the two sides of the sheet facing the wells.

3. In a device for recording maximum temperatures of refrigerators and the like, the combination which comprises two blocks having mating surfaces, one of the blocks being provided with a series of wells spaced from each other over its mating surface, a plurality of substances having different melting points disposed respectively in the wells, a reversible removable sheet having one side composed of absorbent material and the other side composed of impermeable material disposed between the two mating surfaces and covering the wells, and spring clamping means for holding the blocks together with the sheet between their mating surfaces with either of the two surfaces of the sheet facing the wells.

4. In a device for recording maximum temperatures of refrigerators and the like, the combination which comprises two blocks having mating surfaces, one of the blocks being provided with a series of wells spaced from each other over its mating surface, a plurality of substances having different melting points disposed respectively in the wells, a reversible laminated removable sheet having one side composed of absorbent material and its other side composed of resilient impermeable material disposed between the two mating surfaces and covering the wells, and means for clamping the blocks together with the sheet between their mating surfaces with either of the two surfaces of the sheet facing the wells.

5. In a device for recording maximum temperatures of refrigerators and the like, the combination which comprises two blocks having mating surfaces, one of the blocks being provided with a series of wells spaced from each other over its mating surface, a plurality of frozen substances having different melting points and colors disposed respectively in the bottom of the wells so as to leave a space between the top of each substance and the top of the corresponding well, a reversible removable sheet having a side composed of absorbent material and another side of impermeable material disposed between the two mating surfaces and covering the wells, and means for clamping the blocks together with the sheet between their mating surfaces with either surface of the sheet facing the wells.

6. In a device for recording maximum temperatures of refrigerators and the like, the combination which comprises two blocks having mating surfaces, one of the blocks being provided with a series of wells spaced from each other over its mating surface, a plurality of frozen substances having different melting points and which, upon melting, creep on the well surfaces disposed respectively in the wells, a reversible removable sheet having a side composed of absorbent material and another side composed of inpermeable material disposed between the two mating surfaces and covering the wells, and means for clamping the blocks together with the sheet between their mating surfaces with either of the two surfaces of the sheet facing the wells.

7. In a device for recording maximum temperatures of refrigerators and the like, the combination which comprises two blocks having mating surfaces, with a key on one surface and a keyway on the other, one of the blocks being provided with a series of wells spaced from each other over its mating surface, a plurality of substances having different melting points disposed respectively in the wells, a reversible removable sheet having a side composed of absorbent material and another side composed of impermeable material disposed between the two mating surfaces and covering the wells, and means for clamping the blocks together with the sheet between their mating surfaces with either surface of the sheet facing the wells.

References Cited in the file of this patent

UNITED STATES PATENTS

| | | |
|---|---|---|
| 1,535,536 | MacDonald | Apr. 28, 1925 |
| 1,938,583 | Derby | Dec. 12, 1933 |
| 2,375,375 | Lundeen | May 8, 1945 |
| 2,460,215 | Chase | Jan. 25, 1949 |
| 2,540,502 | Aschbacher | Feb. 6, 1951 |
| 2,614,430 | Ballard et al. | Oct. 21, 1952 |
| 2,716,065 | Beckett et al. | Aug. 23, 1955 |